(12) United States Patent
Yoshida et al.

(10) Patent No.: US 7,775,558 B2
(45) Date of Patent: Aug. 17, 2010

(54) WEBBING HOLDING DEVICE

(75) Inventors: Yasuhiro Yoshida, Aichi-ken (JP); Hiroshi Ogura, Aichi-ken (JP); Shoji Tomita, Aichi-ken (JP); Naoki Naito, Toyota (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 415 days.

(21) Appl. No.: 11/851,814

(22) Filed: Sep. 7, 2007

(65) Prior Publication Data

US 2008/0061179 A1 Mar. 13, 2008

(30) Foreign Application Priority Data

Sep. 12, 2006 (JP) ............................. 2006-246617

(51) Int. Cl.
*B60R 22/00* (2006.01)
(52) U.S. Cl. ..................... 280/801.1; 297/464; 297/470
(58) Field of Classification Search .............. 280/801.1; 297/464, 470
See application file for complete search history.

(56) References Cited

U.S. PATENT DOCUMENTS 4,310,176 A * 1/1982 Furusawa et al. ........ 280/801.1
5,855,047 A * 1/1999 Haas ............................ 24/684
6,092,875 A * 7/2000 Pleyer ......................... 297/470
7,178,876 B2 * 2/2007 Borgward et al. ........... 297/481

FOREIGN PATENT DOCUMENTS

JP 2001-122080 5/2001
JP 2004-106561 4/2004

* cited by examiner

*Primary Examiner*—Eric Culbreth
(74) *Attorney, Agent, or Firm*—Roberts Mlotkowski Safran & Cole, P.C.; Thomas W. Cole (57) ABSTRACT

A webbing holding device is proposed, which prevents or controls abrupt reduction in take-up speed when taking-up of webbing is completed. In the webbing holding device, when the webbing is released from being fitted over an occupant, the webbing is wound to a retractor by biasing force. Here, immediately before taking-up of the webbing is completed, a guide strap is stretched by movement of a leading end portion of the webbing toward the back side of a vehicle, and thus the guide strap applies biasing force to the leading end portion of the webbing, so that the take-up speed of the webbing is reduced. Therefore, when winding of the webbing is finished, take-up speed of the webbing being abruptly reduced may be prevented or controlled, and therefore extraction of the webbing from the retractor being locked by a lock mechanism of the retractor may be prevented or controlled.

13 Claims, 8 Drawing Sheets

FIG. 8

WEBBING HOLDING DEVICE

CROSS-REFERENCE TO RELATED APPLICATION

This application claims priority under 35 USC 119 from Japanese Patent Application No. 2006-246617, the disclosure of which is incorporated by reference herein.

BACKGROUND

1. Technical Field

The present invention relates to a webbing holding device by which a webbing can be fitted on a vehicle occupant.

2. Related Art

As a webbing device (seat belt device), a device is given, in which when acceleration for extracting a webbing from a seat belt retractor is a predetermined acceleration or more, a lock section of a lock member is engaged with an internal tooth of a latch cup in a lock mechanism of a seat belt retractor, thereby extraction of the webbing is locked.

Here, in such a webbing device, the lock mechanism preferably has an anti-endlock structure such that when the seat belt retractor winds the whole windable webbing, the lock mechanism does not operate (endlock) by reaction of impact received when winding is finished.

SUMMARY

In consideration of the above fact, the invention provides a webbing holding device, in which abrupt reduction in take-up speed of the webbing into the winding mechanism, which may occur when winding of a webbing into a winding mechanism is finished, is prevented or controlled even by a mechanism or the like other than the winding mechanism, so that endlock can be prevented or controlled.

BRIEF DESCRIPTION OF THE DRAWINGS

Embodiments of the present invention will be described in detail based on the following figures, wherein.

DETAILED DESCRIPTION

Hereinafter, an example of an embodiment of the invention is described in detail with reference to drawings.

First Embodiment

Figure 1:
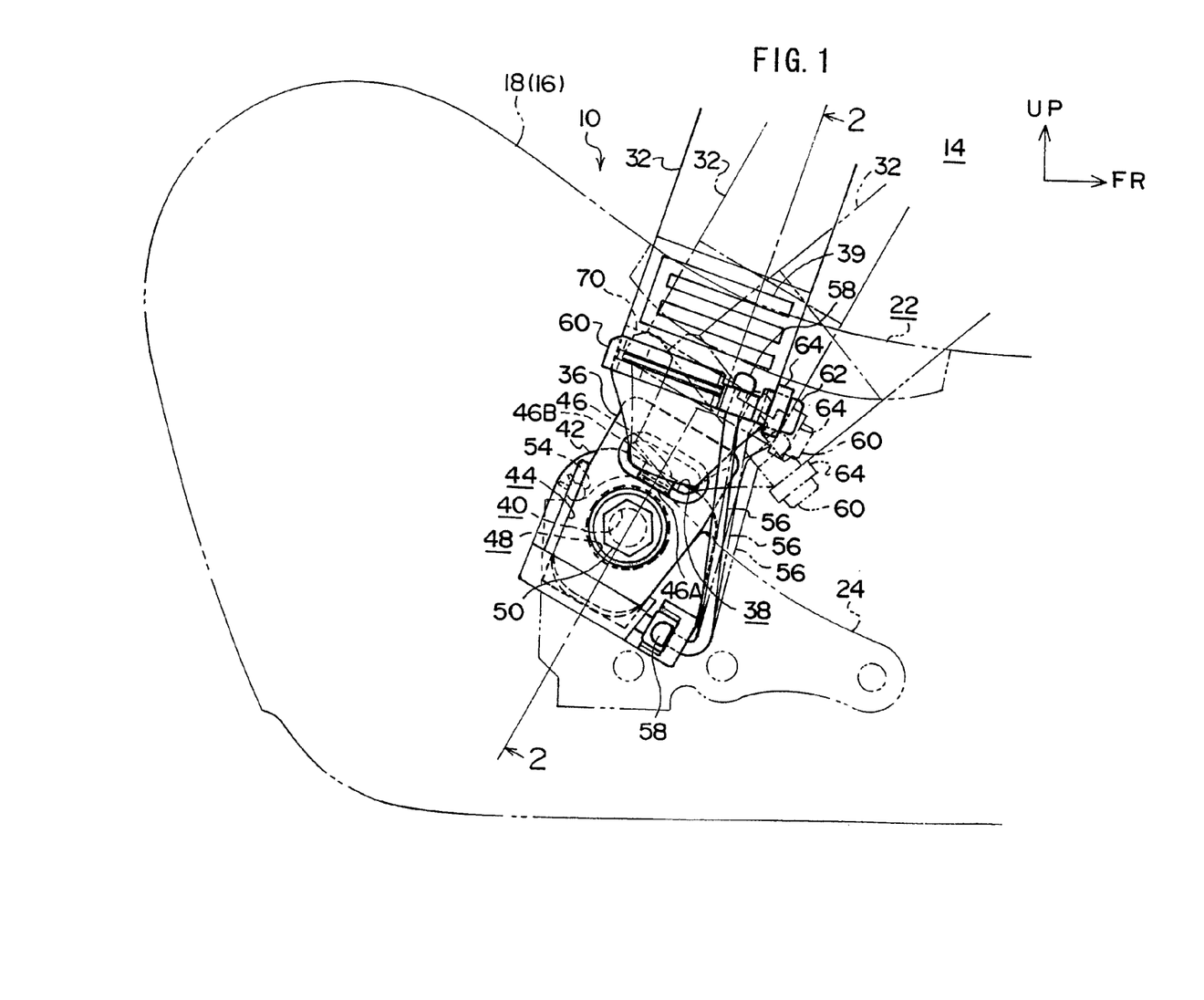
FIG. 1 is a side diagram in a view from a right side of a vehicle, showing major portions of a webbing holding device according to a first embodiment of the invention.
Figure 2:
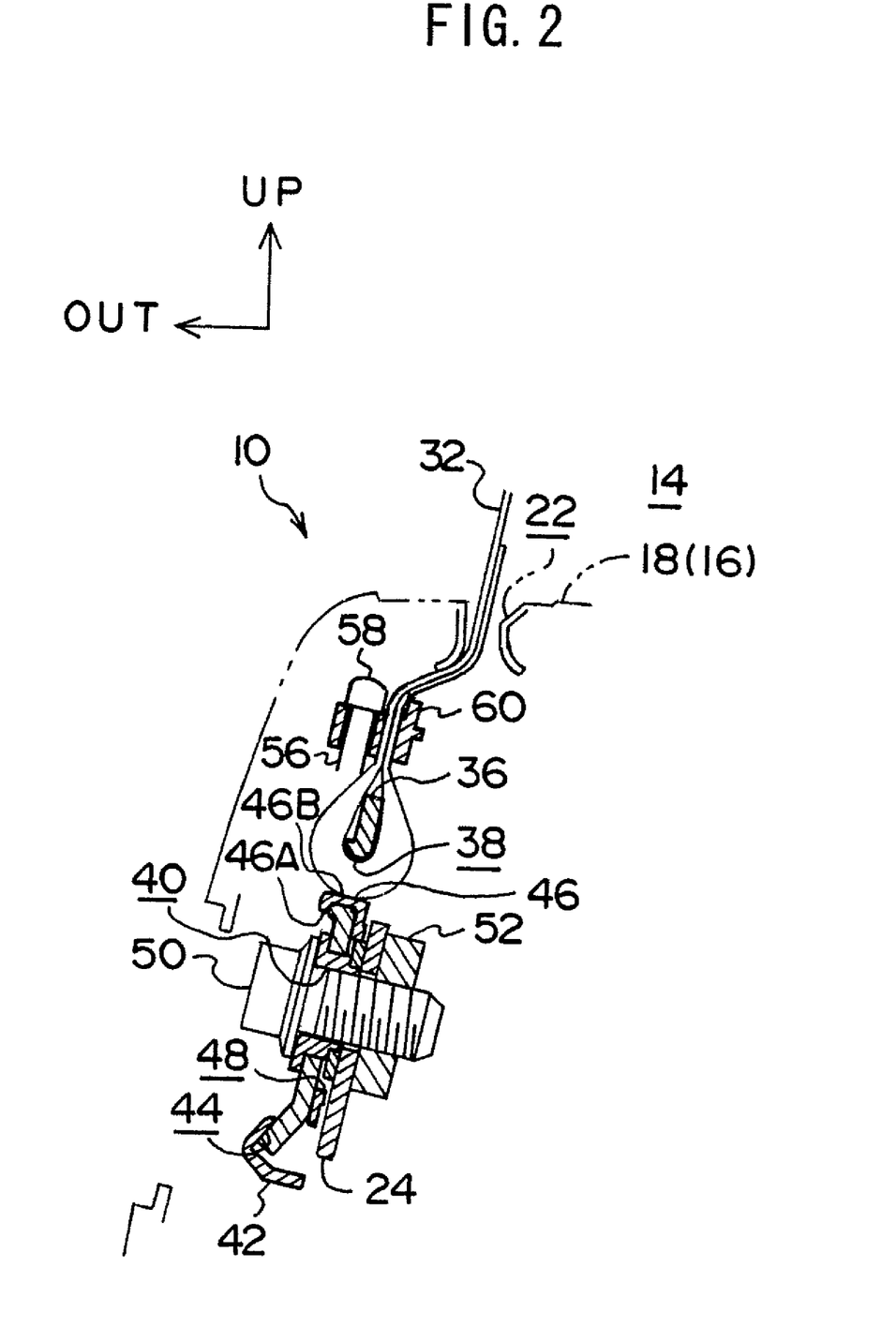
FIG. 2 is a section diagram (section diagram along a line 2-2 in FIG. 1) in a view from the front side of a vehicle, showing the major portions of the webbing holding device according to the first embodiment of the invention.
Figure 3:
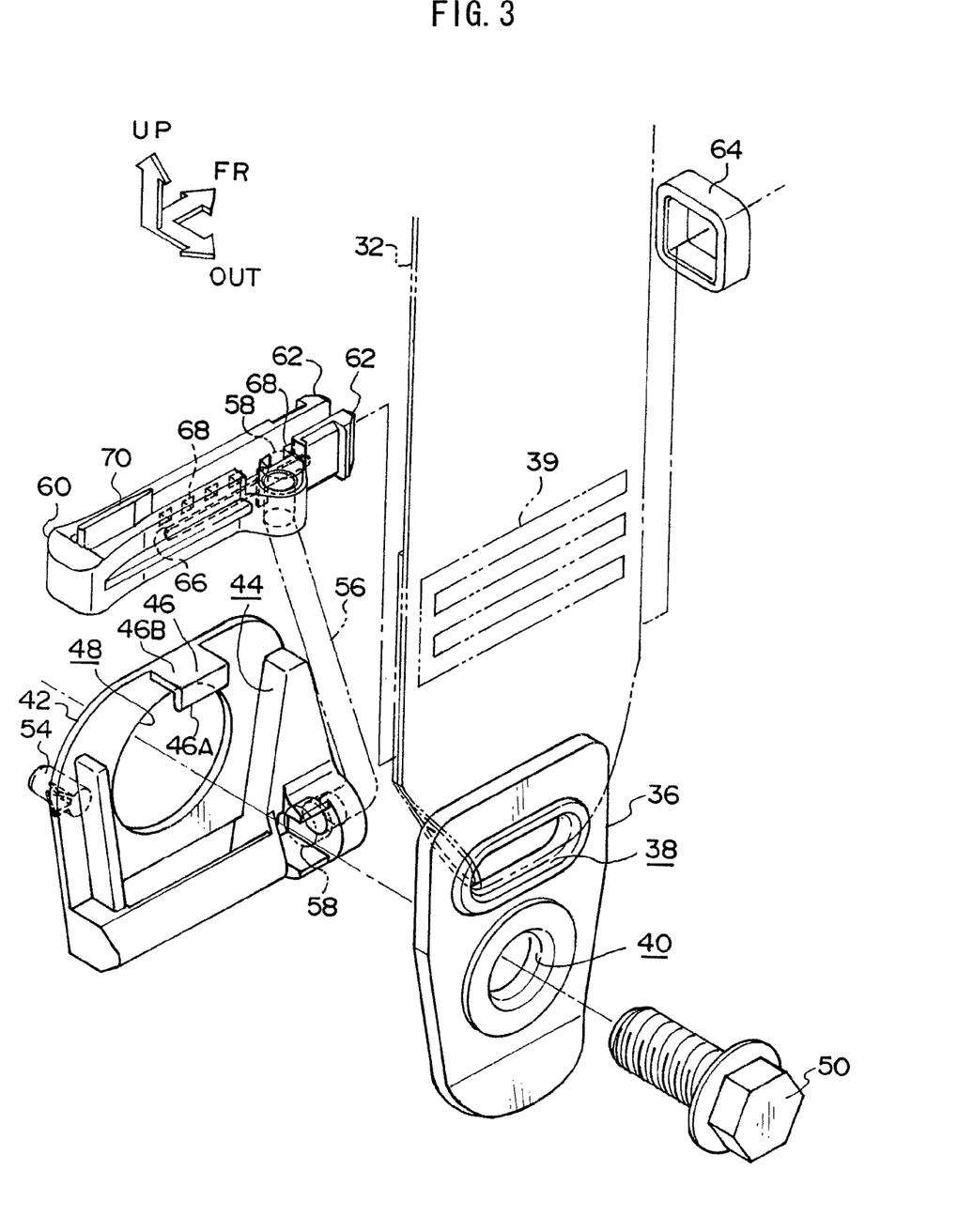
FIG. 3 is an exploded perspective diagram in a view from a diagonally backward right side of a vehicle, showing the major portions of the webbing holding device according to the first embodiment of the invention.
Figure 4:
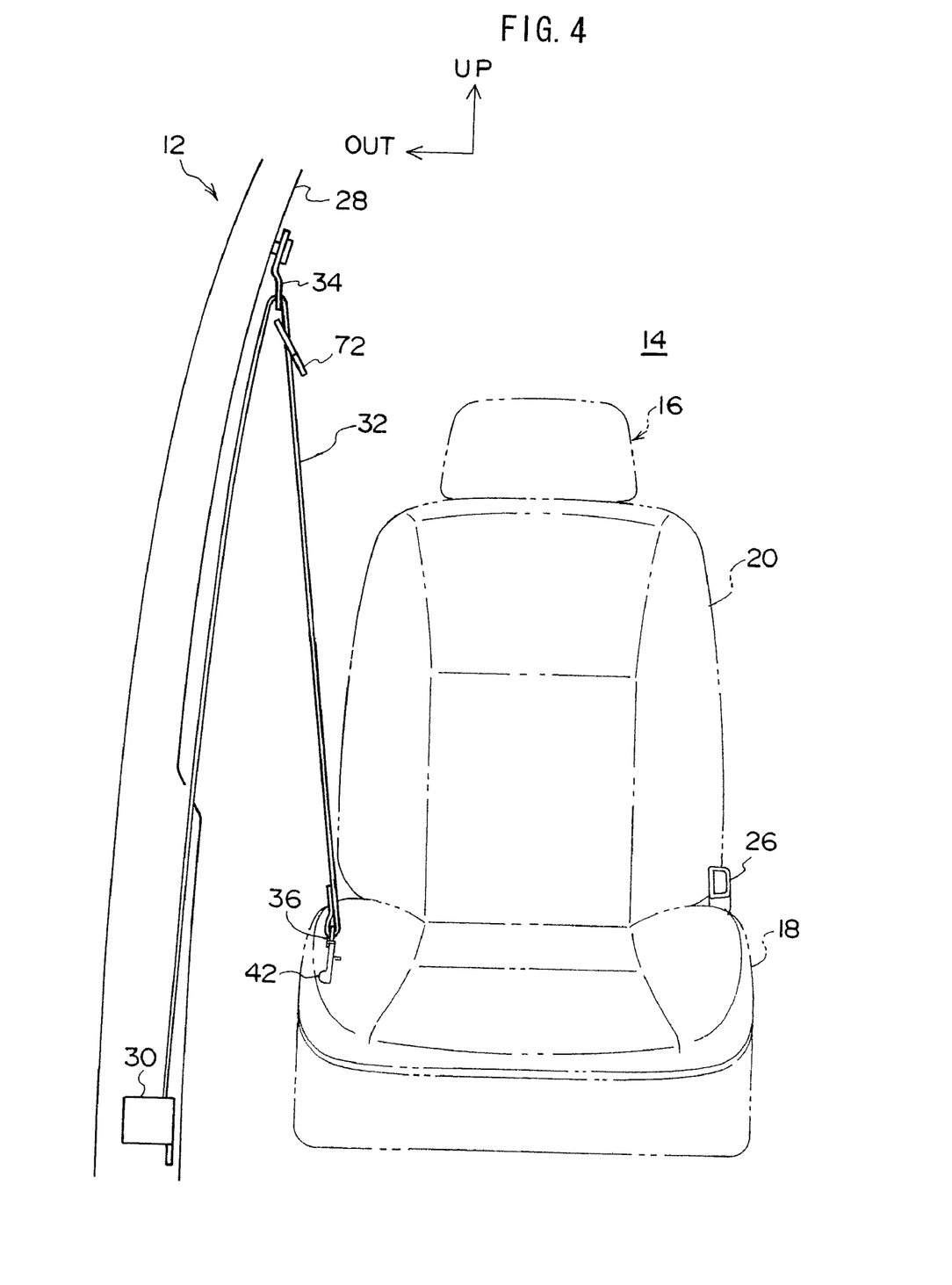
FIG. 4 is a front diagram of major portions of a vehicle in a view from the front side of the vehicle, the vehicle being configured using the webbing holding device according to the first embodiment of the invention.

FIG. 1 shows major portions of a webbing holding device 10 (seat belt device) according to a first embodiment of the invention in side view from the right side of a vehicle, and FIG. 2 shows the major portions of the webbing holding device 10 in cross-section (cross-section along line 2-2 in FIG. 1) as viewed from the front side of a vehicle. Furthermore, FIG. 3 shows the major portions of the webbing holding device 10 in an exploded perspective diagram as viewed diagonally from the backward right side of a vehicle, and FIG. 4 shows major portions of a vehicle 12 configured using the webbing holding device 10 in front view from the front side of the vehicle. In the figures, the front side of the vehicle is shown by an arrow FR, an outer side in a vehicle width direction (the right side of the vehicle) is shown by an arrow OUT, and an upper side is shown by an arrow UP.

In a vehicle 12 in the embodiment, a seat 16 (for example, a driver seat or a passenger seat) is provided in a vehicle interior 14, and a front side of the seat 16 faces to the front side of the vehicle. The seat 16 has a seat cushion 18 and a seat back 20, wherein the seat cushion 18 is disposed approximately horizontally, and the seat back 20 is designed extend up from the upper side of an edge of the seat cushion 18 at the back side of the vehicle. The seat 16 is designed such that an occupant (omitted to be shown) can sit thereon, the seat cushion 18 supports the upper half of the body of the occupant while the occupant is seated thereon, and the seat back 20 supports tilting of the upper half of the body of the occupant to the back side of the vehicle.

A top of the seat cushion 18 has a long, rectangular opening 22 in an end portion at the back side of the vehicle and at an outer side in the vehicle width direction. The opening 22 extends in front-rear direction of the vehicle. A bracket 24, which is made of metal and in a plate shape, is fixed at the end portion of the inside of the seat cushion 18 at the back side of the vehicle and at the outer side in the vehicle width direction. The bracket 24 is in communication with the outside of the seat cushion 18 via the opening 22. Moreover, in the seat cushion 18, a buckle 26 (inner anchor) as a fitting mechanism is latched to an end portion of the seat cushion 18 at the back side of the vehicle and at the outer side in the vehicle width direction.

At a lower part of a sidewall 28 (for example, pillar) of the vehicle interior 14, is fixed a retractor 30 as a winding mechanism. In the retractor 30, a long belt-like webbing 32 (seat belt) is taken-up from a base end side, and the webbing 32 can be extracted from the retractor 30. The retractor 30 has a coil spring (omitted to be shown) as a winding tool. The coil spring biases the webbing 32 in a winding direction of the retractor 30, so that when the webbing 32 is extracted from the retractor 30, the webbing 32 can be taken-up to the retractor 30 by biasing force.

The retractor 30 has a lock mechanism (omitted to be shown) as a lock unit, and when acceleration increases in the direction of extracting the webbing 32 from the retractor 30 to a predetermined acceleration or more, extraction of the webbing 32 from the retractor 30 can be locked. Moreover, the locking of extraction of the webbing 32 from the retractor 30 by the lock mechanism can be released by winding the predetermined amount of webbing 32 into the retractor 30 by the biasing force of the coil spring.

The side of the webbing 32 toward the leading end with respect to the retractor 30 extends into the vehicle interior 14 from the inside of the side wall 28. The side of the webbing 32 toward the leading end with respect to the extending portion into the vehicle interior 14 is movably inserted into a shoulder anchor 34 (upper anchor) as an upper support member. The shoulder anchor 34 is latched to an upper end portion of the sidewall 28, the webbing 32 being thereby supported by the shoulder anchor 34 at the vehicle outside and above the seat back 20.

A leading end portion of the webbing 32 is inserted into the seat cushion 18 from the opening 22 of the seat cushion 18, and the leading end portion of the webbing 32 has an outer anchor 36 (lap outer anchor) as an outer support member which is made of metal and in an approximately rectangular plate shape. In a portion at an upper side of the outer anchor 36, an insertion hole 38 being long and approximately rectangular is penetratingly formed, and the insertion hole 38 is inserted with the webbing 32. A sewn section 39 is provided to the leading end portion of the webbing 32, and portions of webbing 32 before and behind the insertion hole 38 are sewn together, thereby the leading end portion of the webbing 32 is latched to the outer anchor 36. A circular latch hole 40 is penetratingly formed in a lower side portion of the outer anchor 36.

The outer anchor 36 has a case 42 attached thereto as an attachment member being made of hard resin and in an approximately rectangular plate shape. In the case 42, an approximately rectangular plate-like attachment groove 44 as an attachment site is formed, wherein an upper side of the attachment groove 44 is open, and the outer side in the vehicle width direction is open except for at a lower end. At an upper end of the case 42, an L-shaped, plate-like attachment claw 46 as an attachment section is integrally formed. The attachment claw 46 projects to the outer side in the vehicle width direction from the case 42 and is disposed above the attachment groove 44, and a leading end portion 46A extends downward.

A lower portion of the outer anchor 36 is accommodated in the attachment groove 44 approximately fitted therein, so that the outer anchor 36 is limited in movement with respect to the case 42 to the front side of the vehicle, back side of the vehicle, and inner and lower sides in the vehicle width direction, and a lower end of the outer anchor 36 is limited in movement with respect to the case 42 to the outer side in the vehicle width direction. In the attachment claw 46, a base end portion 46B of the attachment claw 46 is inserted into the insertion hole 38 of the outer anchor 36, and the leading end portion 46A of the attachment claw 46 is disposed at the outer side in the vehicle width direction at a side lower than the insertion hole 38 of the outer anchor 36, so that the outer anchor 36 is limited in movement to the upper side with respect to the case 42, and an upper side portion of the outer anchor 36 is limited in movement to the outer side in the vehicle width direction with respect to the case 42. According to the above, the outer anchor 36 is limited in movement with respect to the case 42.

In a central portion of the case 42, a circular through-hole 48 is penetratingly formed, and the through-hole 48 is formed larger than the latch hole 40 of the outer anchor 36. The outer anchor 36 and the case 42 are rotatably attached to a portion of the bracket 24 at the outer side in the vehicle width direction by fastening of a bolt 50 and a nut 52 while the bolt 50 is inserted through the latching hole 40 and the through-hole 48, so that the leading end portion of the webbing 32 is supported by the outer anchor 36 in a vehicle back side end portion of the seat cushion 18 and at the outer side thereof in the vehicle width direction. The webbing 32 is tensioned by the biasing force of the coil spring on the retractor 30, and is thus completely taken-up by the retractor 30 (the whole windable portion is taken-up by the retractor 30), so that a portion of the webbing 32 between the portion inserted into the shoulder anchor 34 and the portion inserted into the opening 22 extends in a straight line.

As a limiting tool a circular axial limiter shaft 54 as a limiter tool is integrally formed to a portion of the case 42 at a vehicle back side thereof. The limiter shaft 54 projects from the case 42 to an inner side in the vehicle width direction. The limiter shaft 54 is contacted to the periphery of the bracket 24, limiting rotation of the case 42 and the outer anchor 36 to the back side of the vehicle with respect to the bracket 24.

An end at a lower side of a string-like guide strap 56 as a deceleration tool (biasing tool) is passed through a lower end of the case 42 at the front side of the vehicle, and the guide strap 56 has elasticity (biasing force) so as to be able to extend and contract in a longitudinal direction of the guide strap 56. A bottomed, substantially cylindrical piece 58 is fixed to an edge at a lower side of the guide strap 56 by crimping. The piece 58 is latched on the lower end of the case 42, thereby the guide strap 56 is prevented from coming out from the case 42, and consequently the guide strap 56 is connected to the case 42.

An end at an upper side of the guide strap 56 is connected to a clamp 60 as a connection unit, which is made of resin and has a section in a shape of an approximately U-shaped plate, and the upper side end of the guide strap 56 is passed through a portion of the clamp 60 at the outer side in the vehicle width direction and at the front side of the vehicle. A bottomed, substantially cylindrical piece 58 is fixed to an edge at the upper side of the guide strap 56 by crimping. The piece 58 is latched on the portion of the clamp 60 at the outer side in the vehicle width direction and at the front side of the vehicle, thereby the guide strap 56 is prevented from coming out from the clamp 60, and consequently the guide strap 56 is connected to the clamp 60.

The leading end portion of the webbing 32 is sandwiched between portions of the clamp 60 at outer and inner sides in the vehicle width direction. Triangular-prism-like locking claws 62 are formed at tips (ends at the vehicle front side) of the portions of the clamp 60 at the outer and inner sides in the vehicle width direction, and the locking claw 62 at the outer side in the vehicle width direction projects from the clamp 60 to the outer side in the vehicle width direction, and the locking claw 62 at the inter side in the vehicle width direction projects from the clamp 60 to the inner side in the vehicle width direction. A portion near the end at the front side of the vehicle of the clamp 60 is inserted into a rectangular tubular lock 64 while the leading end portion of the webbing 32 is disposed between the portions of the clamp 60 at the outer and inner sides in the vehicle width direction. Thus, the portions of the clamp 60 at the outer and inner sides in the vehicle width direction are close to each other in the vehicle width direction, so that the leading end portion of the webbing 32 is sandwiched between the portions of the clamp 60 at the outer and inner sides in the vehicle width direction, and the lock 64 is latched with the pair of locking claws 62, and consequently the lock 64 is prevented from coming out from the clamp 60 to the front side of the vehicle.

A clamping plate 66 being trapezoidal in section and in a long plate-like shape is integrally formed to the portion of the clamp 60 at the outer side in the vehicle width direction. The clamping plate 66 is disposed along a longitudinal direction of the portion of the clamp 60 at the outer side in the vehicle width direction, and projects toward the inside from the portion of the clamp 60 at the outer side in the vehicle width direction and the vertical width thereof gradually decreases. A predetermined number of quadrangular pyramid-like clamping projections 68 are integrally formed to the portion of the clamp 60 at the inner side in the vehicle width direction. The clamping projections 68 are disposed at intervals (at a regular interval) along a longitudinal direction of the portion of the clamp 60 at the inner side in the vehicle width direction, and project while gradually decreasing in sectional area from the portion of the clamp 60 at the inner side in the vehicle width direction to the portion at the outer side in the direction. The clamping plate 66 and the predetermined number of clamping projections 68 face each other in the vehicle width direction, and the leading end portion of the webbing 32 is firmly nipped between the clamping plate 66 and the predetermined number of clamping projections 68.

A long, plate-like insertion plate 70 is integrally formed to an intermediate portion in a longitudinal direction of the clamp 60 (a portion at the vehicle back sidethereof, portion connecting between portions at the outer and inner sides in the vehicle width direction). The insertion plate 70 projects from the intermediate portion in the longitudinal direction of the clamp 60 toward the front side of the vehicle, and is disposed between the portions of the clamp 60 at the outer and inner sides in the vehicle width direction. The insertion plate 70 is inserted between a portion near the base end side of the webbing 32 with respect to the insertion hole 38 and a portion near the leading side of the webbing 32 with respect to the insertion hole 38.

The webbing 32 is tensioned by the biasing force of the coil spring on the retractor 30, thereby it extends from the outer anchor 36 to an upper side thereof, and passes through a portion of the opening 22 at the vehicle back side of the, so that the guide strap 56 is stretched via the clamp 60, and consequently the guide strap 56 biases the leading end portion of the webbing 32 via the clamp 60 to a lower side and to the front side of the vehicle.

The webbing 32 is movably inserted through a tongue 72 as an inner support member between the portion inserted into the shoulder anchor 34 and the portion inserted into the opening 22, and the webbing 32 is extracted from the retractor 30, and the tongue 72 is fitted in the buckle 26, thereby the webbing 32 can be supported by the tongue 72 at a portion of the seat cushion 18 at the inner side in the vehicle width direction and at the back side of the vehicle. Thus, the webbing 32 is fitted over an occupant seated on the seat 16, and the webbing 32 spans across in an oblique direction from a shoulder of the occupant at the outer side in the vehicle width direction to the waist of the occupant at the inner side in the vehicle width direction, and the webbing 32 is spans across the waist of the occupant in a lateral direction from the inner side to the outer side in the vehicle width direction. When the webbing 32 is fitted over the occupant, the webbing 32 is drawn from the outer anchor 36 to the obliquely upper front side of the vehicle, and passes through a portion of the opening 22 at the front side of the vehicle, thereby extension of the guide strap 56 is reduced, so that biasing force of the guide strap 56 is reduced, the biasing force being for biasing the leading end portion of the webbing 32, via the clamp 60, toward a lower side and to the front side of the vehicle (see the dashed line and the two-dot chain line in FIG. 1).

The tongue 72 can be removed from the buckle 26. By the tongue 72 being removed from the buckle 26, the webbing 32 is wound into the retractor 30 by the biasing force of the coil spring on the retractor 30, leading to a return to the state in which the webbing 32 is completely taken-up to the retractor 30.

Next, operation of the embodiment is described.

In the webbing holding device 10 in the above configuration, the tongue 72 is fitted in the buckle 26 and the webbing 32 is fitted over an occupant sitting on the seat 16, and when the tongue 72 is removed from the buckle 26 and the webbing 32 is released from being fitted on the occupant, the webbing 32 is taken-up to the retractor 30 by the biasing force of the coil spring on the retractor 30, thereby the webbing 32 is completely taken-up by the retractor 30, and the portion of the webbing 32 between the portion inserted into the shoulder anchor 34 and the portion inserted into the opening 22 of the seat cushion 18 extends in a straight line.

Immediately before taking-up of the webbing 32 to the retractor 30 is finished (immediately before the webbing 32 is completely taken-up by the retractor 30), the leading end portion of the webbing 32 moves (swings) toward the back side of the vehicle due to the biasing force of the coil spring, and the state of the webbing 32 changes from a state in which it passes through the portion of the opening 22 at the front side of the vehicle (see the two-dot chain line in FIG. 1) to a state in which it passes through a portion of the opening 22 at the back side of the vehicle (see a solid line in FIG. 1), via a state in which it passes through an intermediate portion of the opening 22 in the longitudinal direction of the vehicle (see the dashed line in FIG. 1).

Here, immediately before taking-up of the webbing 32 to the retractor 30 is finished, the guide strap 56 is stretched via the clamp 60 by movement of the leading end portion of the webbing 32 to the back side of the vehicle by the biasing force of the coil spring, and the guide strap 56 applies biasing force (deceleration force) to the leading end portion of the webbing 32 via the clamp 60 in a direction toward a lower side and to the front side of the vehicle, thereby the take-up speed of the webbing 32 to the retractor 30 is effectively reduced, so that the webbing 32 is prevented from being caught by the portion of the seat back 20 at the outer side in the vehicle width direction. Therefore, when taking-up the webbing 32 into the retractor 30 is finished (when the webbing 32 is completely taken-up by the retractor 30), abrupt reduction in take-up speed of the webbing 32 into the retractor 30, due to impact caused by the webbing 32 being caught by the portion of the seat back 20 at the outer side in the vehicle width direction, may be prevented or controlled and therefore acceleration in the direction of extracting the webbing 32 from the retractor 30 increasing to a predetermined acceleration or more, so that extraction of the webbing 32 from the retractor 30 is locked (so-called endlock occurs) by the lock mechanism of the retractor 30, may be prevented or controlled.

Figure 5:
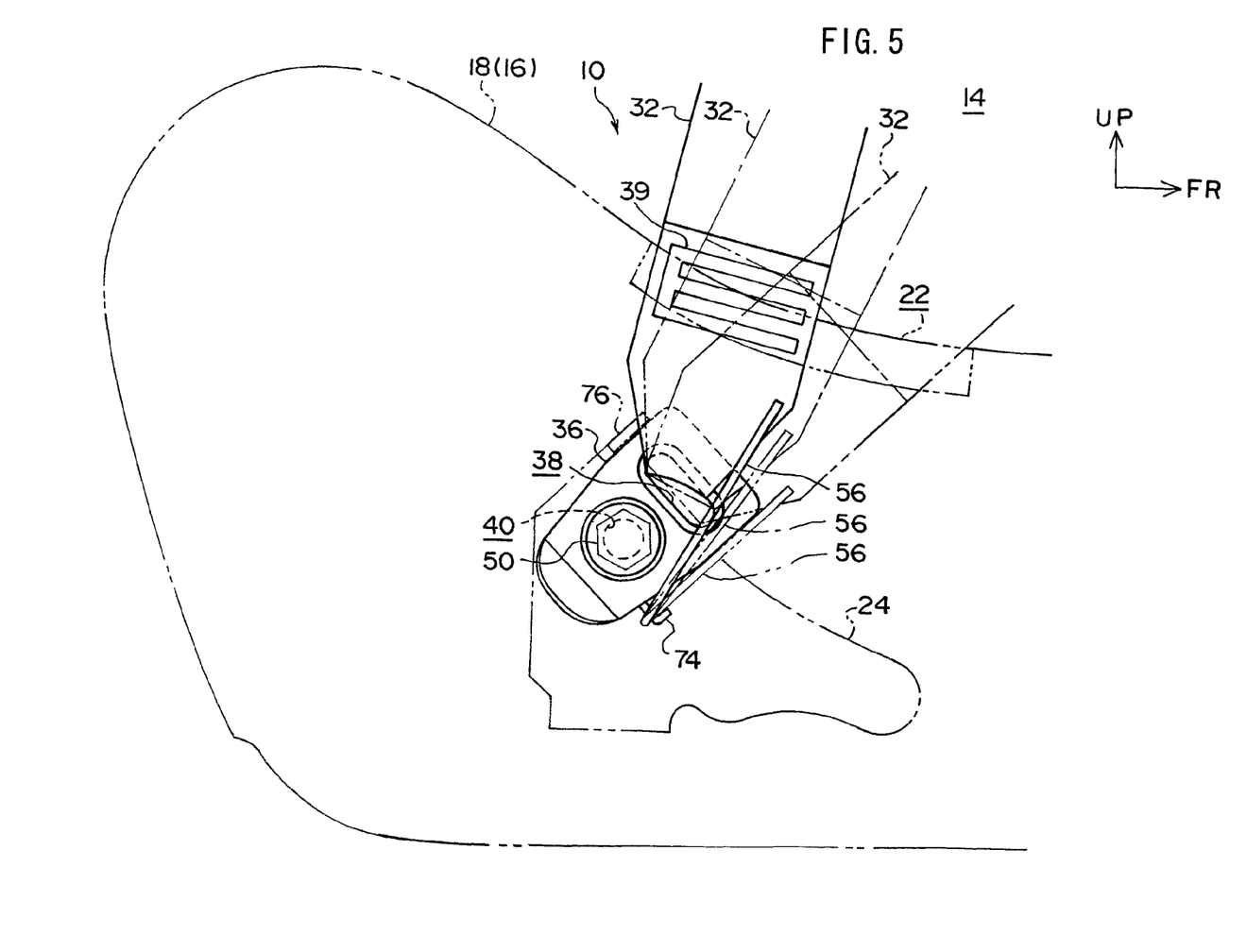
FIG. 5 is a side diagram in a view from the right side of a vehicle, showing another example of the webbing holding device according to the first embodiment of the invention.

While a configuration where the guide strap 56 was connected to the outer anchor 36 via the case 42 was used in the embodiment, a configuration where the guide strap 56 is directly connected to the outer anchor 36 may be used. In this case, as shown in FIG. 5, for example, an L-shaped rod-like connection section 74 is integrally formed to a portion at a lower side of the outer anchor 36 and at the front side of the vehicle, and the connection section 74 is connected with the guide strap 56. Furthermore, a limiter plate 76 as a limiter tool is protrusively formed integrally on the bracket 24 at the upper side of the outer anchor 36 and at the back side of the vehicle, and the limiter plate 76 is contacted with the outer anchor 36, thereby the outer anchor 36 is limited in rotation to the back side of the vehicle with respect to the bracket 24.

Furthermore, while a configuration where the guide strap 56 was connected to the webbing 32 via the clamp 60 was used in the embodiment, a configuration where the guide strap 56 is directly connected to the webbing 32 may be used, as shown in FIG. 5.

Moreover, while a configuration was used in the embodiment, in which immediately before taking-up of the webbing 32 to the retractor 30 was finished, the webbing 32 was biased by the guide strap 56 connected to the outer anchor 36, thereby reducing the take-up speed of the webbing 32 to the retractor 30, a configuration may be used in which immediately before winding of the webbing 32 into the retractor 30 is finished, the webbing 32 is biased by an deceleration unit (biasing unit) connected to the shoulder anchor 34, thereby reducing take-up speed of the webbing 32 into the retractor 30.

Second Embodiment

Figure 6:
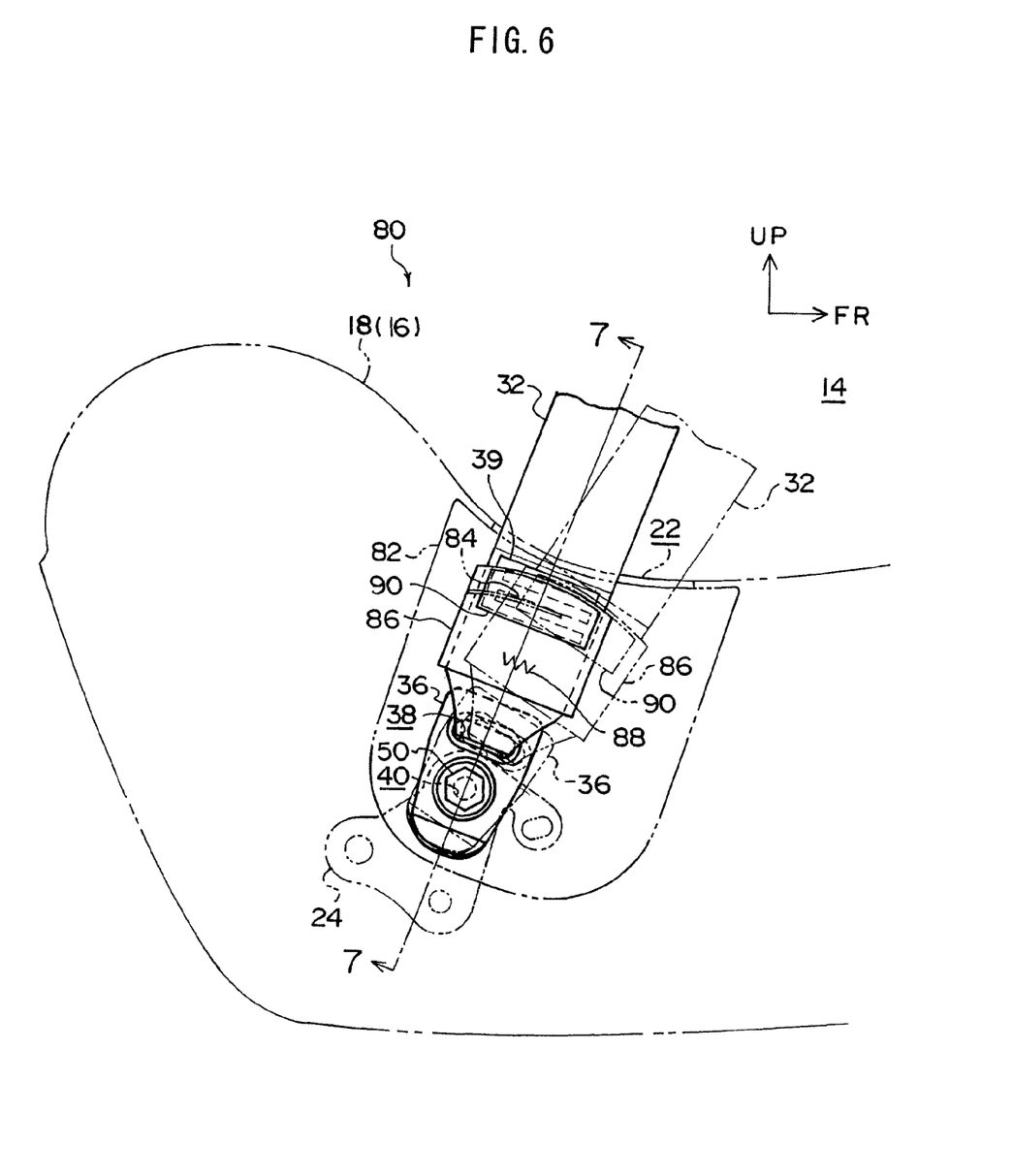
FIG. 6 is a side diagram in a view from the right side of a vehicle, showing major portions of a webbing holding device according to a second embodiment of the invention.
Figure 7:
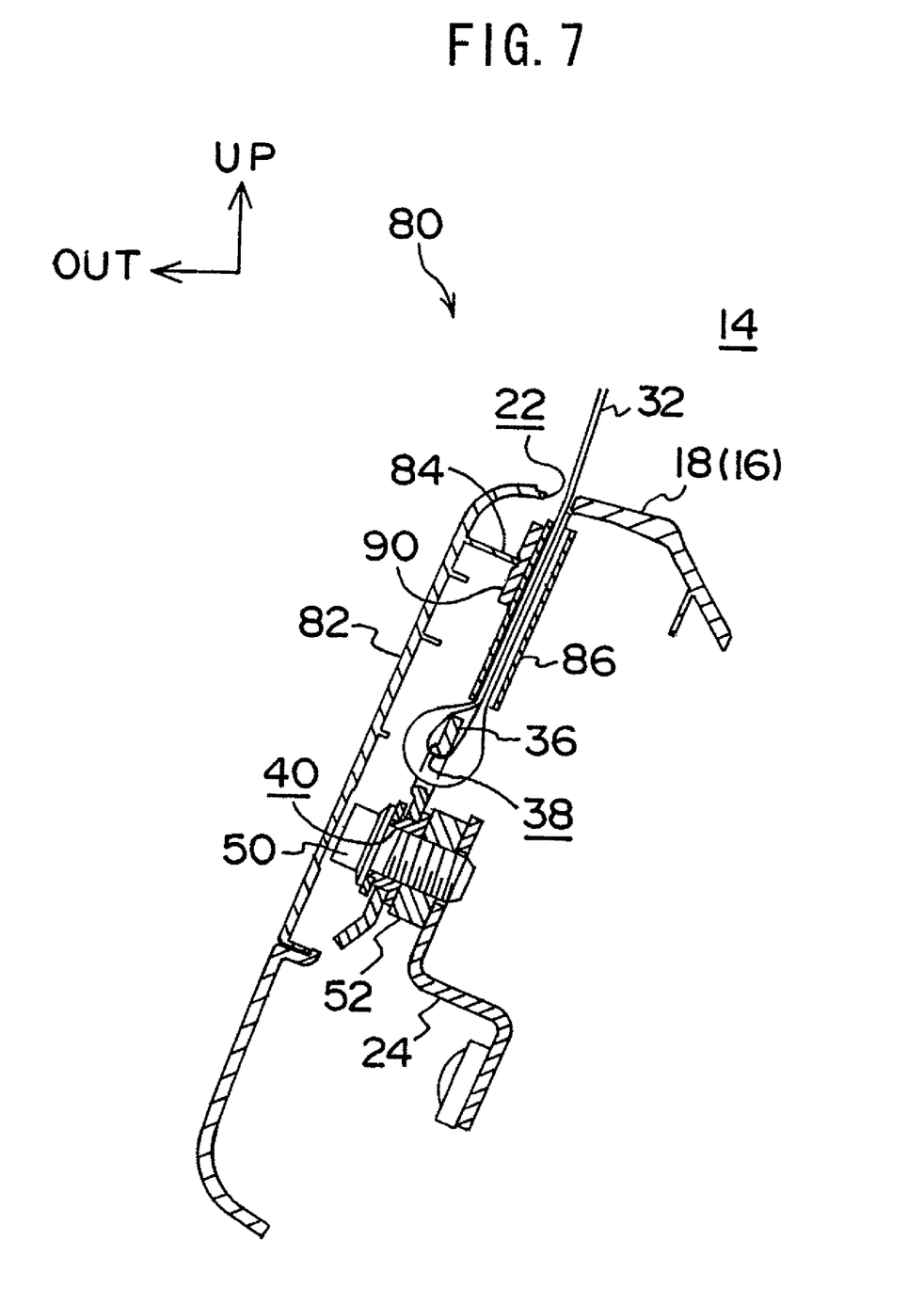
FIG. 7 is a section diagram (section diagram along a line 7-7 in FIG. 6) in a view from the front side of a vehicle, showing the major portions of the webbing holding device according to the second embodiment of the invention.

FIG. 6 shows major portions of a webbing holding device 80 (seat belt device) according to a second embodiment of the invention in a side view from the right of a vehicle, and FIG. 7 shows the major portions of the webbing holding device 80 in a cross-section (cross-section diagram on line 7-7 in FIG. 6) viewed from the front of a vehicle.

The webbing holding device 80 according to the embodiment is approximately the same configuration as in the first embodiment, however, it is different in the following points.

The webbing holding device 80 according to the embodiment does not have the case 42, guide strap 56 and clamp 60 of the first embodiment.

An end at the outer side in the vehicle width direction of the opening 22 of the seat cushion 18 is configured by an upper end of a cover 82 that is made of resin and in an approximately rectangular plate shape, and the cover 82 is fixed within the seat cushion 18 while being disposed to a portion of the bracket 24 at the outer side in the vehicle width direction. A plate-like friction plate 84 as a first friction member configuring a deceleration unit (friction unit) is integrally formed to the cover 82, and the friction plate 84 projects from an upper part of the cover 82 to the inner side in the vehicle width direction. As shown in detail in FIG. 8, a portion at the vehicle front side at a vehicle width direction inside edge of the friction plate 84 is formed as a angled portion 84A, and the angled portion 84A is inclined so as be further to the inner side in the vehicle width direction on moving toward the back side of the vehicle.

The outer anchor 36 is rotatably attached to a portion of the bracket 24 at the outer side in the vehicle width direction by fastening the bolt 50 and the nut 52 while the bolt 50 is passed through the latch hole 40, so that the leading end portion of the webbing 32 is supported by the outer anchor 36 at the end portion of the seat cushion 18 at the back side of the vehicle and at the outer side in the vehicle width direction.

The webbing 32 is tensioned by the biasing force of the coil spring on the retractor 30, and thus completely taken-up by the retractor 30 (the whole windable portion is taken-up by the retractor 30), so that a portion of the webbing 32 between the portion inserted into the shoulder anchor 34 and the portion inserted into the opening 22 extends in a straight line, and the outer anchor 36 and the leading end portion of the webbing 32 are rise up so that the webbing 32 passes through a portion of the opening 22 at the back side of the vehicle.

The leading end portion of the webbing 32 is accommodated in a rectangular, tubular boot 86 as a connection member, except for an insertion portion into the insertion hole 38 of the outer anchor 36. The boot 86 has flexibility. The boot 86 is connected to the leading end portion of the webbing 32 by a suture 88, so that the boot 86 can be moved integrally with the leading end portion of the webbing 32. A sponge 90 (foamed material) as a second friction member, which is in an approximately rectangular prism shape and configures a deceleration unit (friction unit), is fixed to a portion at an upper side on a surface of the boot 86 at the outer side in the vehicle width direction. The sponge 90 has elasticity, and is engaged with the friction plate 84 on the cover 82 (contacted to the friction plate with being elastically deformed).

When the webbing 32 is fitted over an occupant, the outer anchor 36 and the leading end portion of the webbing 32 (including the boot 86) swing to the front side of the vehicle, and the webbing 32 passes through the portion of the opening 22 at the front side of the vehicle. Thus, the amount of engagement of the sponge 90 with the friction plate 84 on the cover 82 is reduced (see the two-dot chain line in FIG. 6).

Next, operation of the embodiment is described.

In the webbing holding device 80 in the above configuration, the tongue 72 is fitted into the buckle 26 and the webbing 32 is fitted over an occupant sitting on the seat 16, and when the tongue 72 is removed from the buckle 26 and the webbing 32 is released from being fitted over the occupant, the webbing 32 is taken-up to the retractor 30 by the biasing force of the coil spring on the retractor 30, thereby the webbing 32 is completely taken-up by the retractor 30, and the portion of the webbing 32 between the portion inserted into the shoulder anchor 34 and the portion inserted into the opening 22 of the seat cushion 18 extends in a straight line.

Immediately before taking-up of the webbing 32 into the retractor 30 is finished (immediately before the webbing 32 is completely taken-up by the retractor 30), the outer anchor 36 and the leading end portion of the webbing 32 (including the boot 86) swing to the back side of the vehicle by the biasing force of the coil spring, and a state in which the webbing 32 passes through the portion of the opening 22 at the front side of the vehicle (see the two-dot chain line in FIG. 6) is changed into a state in which the webbing 32 passes through the portion of the opening 22 at the back side of the vehicle (see the solid line in FIG. 6).

Here, immediately before winding of the webbing 32 into the retractor 30 is finished, the sponge 90 on the boot 86 moves with respect to the friction plate 84 on the cover 82 while being engaged with the friction plate by rotation of the leading end portion of the webbing 32 and the boot 86 to the back side of the vehicle by the biasing force of the coil spring, friction force is generated between the friction plate 84 and the sponge 90, and thereby friction force (deceleration force) is applied to the leading end portion of the webbing 32 via the boot 86, and thereby the take-up speed of the webbing 32 into the retractor 30 is effectively reduced, so that the webbing 32 is prevented from being caught by the portion of the seat back 20 at the outer side in the vehicle width direction. Therefore, when taking-up of the webbing 32 into the retractor 30 is finished (when the webbing 32 is completely taken-up by the retractor 30), abrupt reduction in the take-up speed of the webbing 32 into the retractor 30, due to impact caused by the webbing 32 being caught by the portion of the seat back 20 at the outer side in the vehicle width direction, may be prevented or controlled and therefore increase in the acceleration in the direction of extracting the webbing 32 from the retractor 30 is to a predetermined acceleration or more, so that extraction of the webbing 32 from the retractor 30 is locked (so-called endlock occurs) by the lock mechanism of the retractor 30, may be prevented or controlled.

Figure 8:
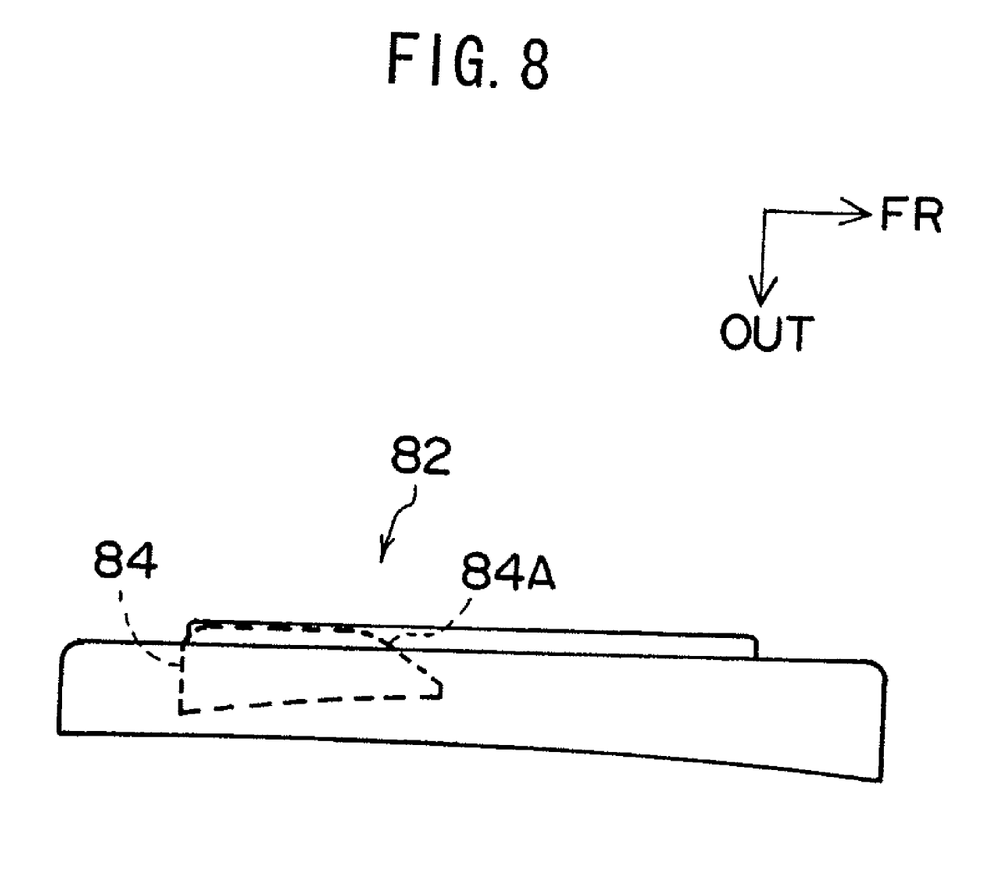
FIG. 8 is a plan diagram in a view from an upper side, showing a cover of the webbing holding device according to the second embodiment of the invention.

Furthermore, at the vehicle width direction inside edge of the friction plate 84, a vehicle front side portion is formed as the angled portion 84A. Thus, the sponge 90 can be excellently moved with respect to the friction plate 84 by swinging of the leading end portion of the webbing 32 and the boot 86 to the back side of the vehicle, so that appropriate friction force can be given between the friction plate 84 and the sponge 90.

While a configuration where the buckle 26 and the outer anchor 36 were latched to the seat cushion 18 was used in the first and second embodiments, a configuration where at least one of the buckle 26 and the outer anchor 36 (the case 42 may be included) is latched to the peripheral wall (sidewall 28 or base plate) may be used.

Furthermore, while a configuration where the shoulder anchor 34 was latched to the sidewall 28 of the vehicle interior 14 was used in the first and second embodiments, a configuration where the shoulder anchor 34 is latched to the seat cushion 18 may be used.

What is claimed is:

1. A webbing holding device, comprising:
    a winding mechanism, for taking-up webbing and from which the webbing is extracted such that the webbing can be fitted over a vehicle occupant, and
    a deceleration mechanism that applies deceleration force to the webbing immediately before take-up of the webbing to the winding mechanism is finished, so that the take-up speed of the webbing to the winding mechanism is reduced,
    wherein the deceleration mechanism applies biasing force to the webbing as the deceleration force, and the deceleration mechanism comprises a guide strap, one end of the guide strap being connected to the webbing, and the other end of the guide strap being fixed to the vehicle, and the guide strap having elasticity so as to be able to extend and contract in its longitudinal direction.

2. The webbing holding device according to claim 1, wherein the deceleration mechanism further comprises:
    an outer anchor that is provided in a leading end portion of the webbing, and swings toward the back side of the vehicle;
    an attachment member fixed to the vehicle; and
    a connection member for connecting the outer anchor to the attachment member.

3. The webbing holding device according to claim 2, wherein the deceleration mechanism further comprises a limiter member for limiting swinging of the outer anchor toward the back side of the vehicle by contact with the outer anchor.

4. The webbing holding device according to claim 1, wherein the webbing holding device comprises:
    a clamp for coupling the guide strap to the webbing by clamping the webbing; and
    a lock for fixing the clamp for preventing the clamp from coming out from the webbing.

5. The webbing holding device according to claim 4, wherein the clamp includes a clamping plate that is disposed projecting along the longitudinal direction of the clamp gradually getting smaller with distance along the longitudinal direction.

6. The webbing holding device according to claim 4, wherein the clamp comprises a predetermined number of clamping projections disposed within the clamp that nip the webbing.

7. The webbing holding device according to claim 1, wherein the deceleration mechanism applies friction force to the webbing as the deceleration force.

8. The webbing holding device according to claim 7, wherein the deceleration mechanism includes a friction plate that is formed at a side of the vehicle, and that reduces the take-up speed of the webbing.

9. The webbing holding device according to claim 8, wherein the deceleration mechanism further comprises:
    an outer anchor that is provided at a leading end portion of the webbing, and swings toward a back side of the vehicle;
    an attachment member fixed to the vehicle; and
    a connection member for connecting the outer anchor to the attachment member.

10. The webbing holding device according to claim 8, wherein the deceleration mechanism comprises:
    a substantially tubular boot for accommodating a leading end portion of the webbing; and
    a foamed material that is fixed to a surface at an outer side of the boot and contacts to the friction plate.

11. The webbing holding device according to claim 8, wherein the friction plate has an angled portion at a vehicle front side portion at the vehicle width direction inside edge of the friction plate.

12. A webbing holding device, comprising:
    webbing that can be extracted from a winding mechanism;
    an outer anchor that is provided in a leading end portion of the webbing, and that swings toward the back side of a vehicle;
    an attachment member fixed to the vehicle; and
    a connection member for connecting the outer anchor to the attachment member;
    a guide strap, one end of the guide strap being connected to the outer anchor, and the other end of the guide strap being fixed to the attachment member, the guide strap having elasticity so as to be able to extend and contract in its longitudinal direction.

13. A webbing holding device, comprising:
    a webbing that can be extracted from a winding mechanism;
    an outer anchor that is provided at a leading end portion of the webbing, and that swings toward a back side of a vehicle;
    an attachment member fixed to the vehicle;
    a connection member for connecting the outer anchor to the attachment member;
    a friction plate that is formed at a side of the vehicle, and that reduces a take-up speed of the webbing;
    a substantially tubular boot for accommodating a leading end portion of the webbing; and
    a foamed material that is fixed to a surface at an outer side of the boot and contacts to the friction plate.

* * * * *